United States Patent
Wang et al.

(10) Patent No.: US 7,936,777 B2
(45) Date of Patent: May 3, 2011

(54) PARALLEL DETECTION OF REMOTE LPI REQUEST AND SEND ZERO MODE

(75) Inventors: Peiqing Wang, Irvine, CA (US); Xiaotong Lin, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 130 days.

(21) Appl. No.: 12/488,232

(22) Filed: Jun. 19, 2009

(65) Prior Publication Data
US 2010/0322078 A1 Dec. 23, 2010

(51) Int. Cl.
*H04L 12/66* (2006.01)
(52) U.S. Cl. ...................................................... 370/463
(58) Field of Classification Search .......... 370/282–284, 370/311, 445, 463, 522
See application file for complete search history.

(56) References Cited

U.S. PATENT DOCUMENTS
2008/0225841 A1* 9/2008 Conway et al. ............... 370/389
2009/0282277 A1* 11/2009 Sedarat et al. ................ 713/320

OTHER PUBLICATIONS

Healey et al, 1000BASE-T Low-Power Idle, LSI Corporation, 14 pages, Jan. 2008.*
Grimwood et al, IEEE P802.3az/D1.o Clause 40 Ipi_mode Encoding, Broadcom, 12 pages, Nov. 2008.*
Dove, Energy Efficient Ethernet Switching Perspective, ProCurve Networking by HP, 19 pages, May 2008.*
Gunaratne et al, Reducing the Energy Consumption of Ethernet with Adaptive Link Rate (ALR), IEEE, Apr. 2008.*

* cited by examiner

*Primary Examiner* — Frank Duong
(74) *Attorney, Agent, or Firm* — Sterne Kessler Goldstein & Fox, P.L.L.C.

(57) ABSTRACT

Embodiments of the present invention enable robust and quick parallel detection of the remote LPI request signal (rem_lpi_req) and SEND ZERO mode (SEND_Z) defined in the Energy Efficient Ethernet (EEE) standard. Embodiments do not rely on energy detection for detecting SEND_Z. Therefore, SEND_Z can be detected reliably and with minimal latency. In addition, since SEND_Z and rem_lpi_req are detected in parallel, embodiments are not concerned with the false detection of rem_lpi_req (before SEND_Z is detected) or the need to disable detection of rem_lpi_req (after SEND_Z is detected).

19 Claims, 8 Drawing Sheets

PARALLEL DETECTION OF REMOTE LPI REQUEST AND SEND ZERO MODE

BACKGROUND OF THE INVENTION

1. Field of the Invention

The present invention relates generally to Energy Efficient Ethernet (EEE).

2. Background Art

The Energy Efficient Ethernet (EEE) standard, developed by the IEEE 802.3az Task Force, provides an optional mode of operation for Ethernet which allows Ethernet nodes to save power by disabling certain functionality (e.g., transmit and receive functions) over periods of low link utilization. The EEE mode of operation, called Low Power Idle (LPI) mode, can be supported over various Ethernet MAC (Medium Access Control) and PHY (Physical Layer) configurations.

According to the EEE standard, before entering or exiting LPI mode, an Ethernet node informs its link partner(s) that it intends to enter or exit LPI mode by conveying to its link partner a local EEE-defined PHY level signal (loc_lpi_req). The link partner decodes the conveyed signal to generate another EEE-defined PHY level signal (rem_lpi_req) representative of the LPI status of the Ethernet node. In addition, LPI defines a SEND ZERO PHY transmission mode (SEND_Z) that the PHY of an Ethernet node enters when it completes transitioning into LPI mode, and during which the PHY completely ceases transmission on the link.

When the PHY of its link partner enters SEND_Z mode, an Ethernet node cannot determine whether its link partner is still conveying its loc_lpi_req signal or is already sending zeros. Therefore, unless the Ethernet node can quickly determine whether or not its link partner PHY has entered SEND_Z, the Ethernet node will falsely detect rem_lpi_req and accidentally transition out of LPI mode.

Conventional solutions rely on energy detection (either analog or digital) to detect whether the link partner PHY is transmitting energy on the link. If no energy is detected, then it is assumed that the link partner PHY has entered SEND_Z mode. However, for several reasons, conventional solutions are impractical. For example, solutions based on analog energy detection falsely detect energy on the link because of echo and crosstalk from the local transmitter. On the other hand, digital energy detection solutions first remove the echo and crosstalk, but suffer from latency associated with removing echo and crosstalk, which can be too high to avoid false detection of rem_lpi_req. In addition, even when SEND_Z is detected correctly, conventional solutions require that detection of rem_lpi_req be disabled during SEND_Z mode to avoid false detection of rem_lpi_req and accidental transitioning out of LPI mode by the PHY.

Accordingly, new solutions are needed to detect rem_lpi_req and SEND_Z mode, which do not suffer from the problems described above of conventional solutions.

BRIEF SUMMARY OF THE INVENTION

The present invention relates generally to Energy Efficient Ethernet (EEE).

Embodiments of the present invention enable robust and quick parallel detection of the remote LPI request signal (rem_lpi_req) and the SEND ZERO transmission mode (SEND_Z) defined in the EEE standard.

Embodiments do not rely on energy detection for detecting SEND_Z. Therefore, SEND_Z can be detected reliably and with minimal latency. In addition, since SEND_Z and rem_lpi_req are detected in parallel, embodiments are not concerned with the false detection of rem_lpi_req (before SEND_Z is detected) or the need to disable detection of rem_lpi_req (after SEND_Z is detected).

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. Generally, the drawing in which an element first appears is typically indicated by the leftmost digit(s) in the corresponding reference number.

DETAILED DESCRIPTION OF EMBODIMENTS

Introduction

Figure 1:
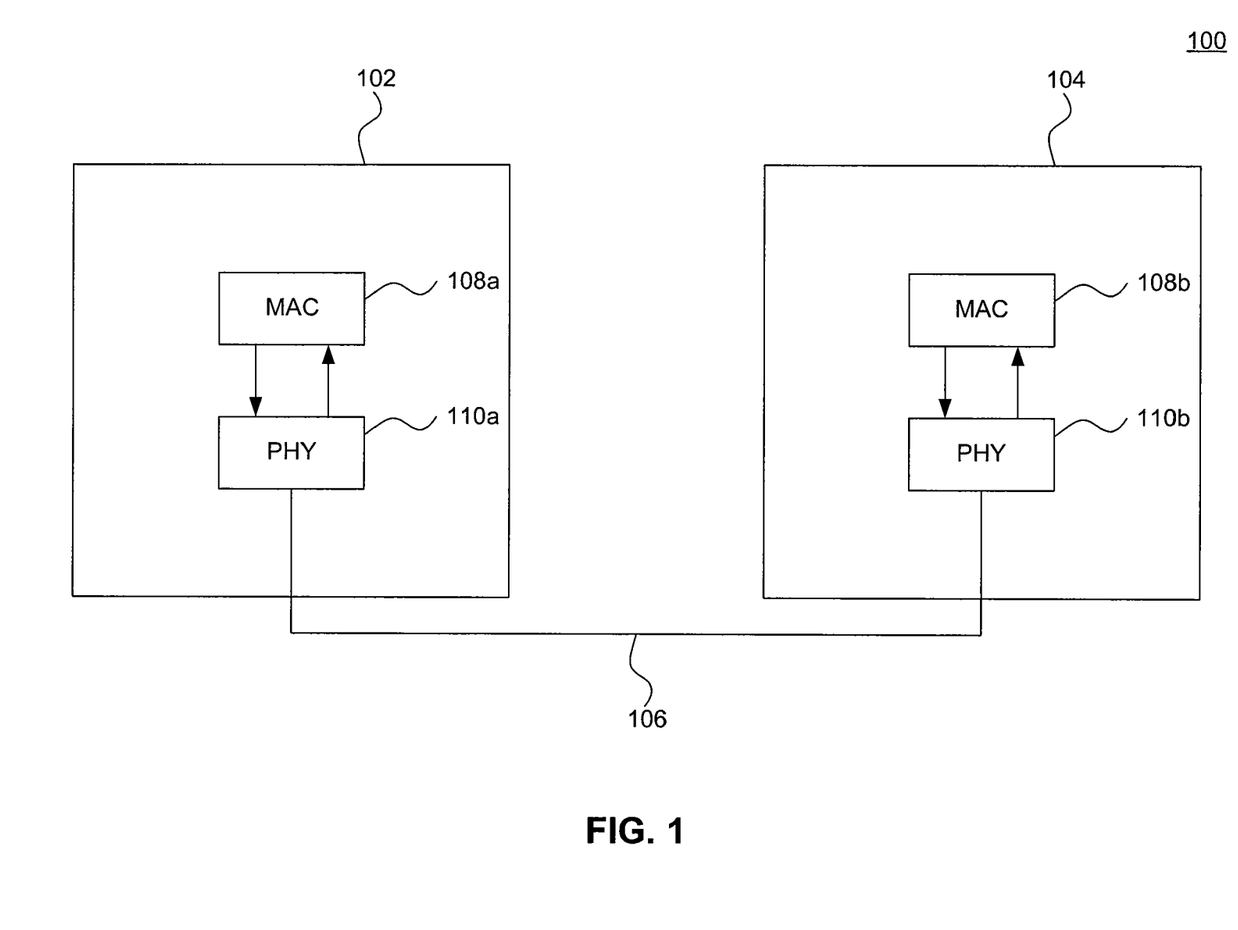
FIG. 1 is a block diagram that illustrates an example Ethernet network.

FIG. 1 is a block diagram that illustrates an example Ethernet network 100. As shown in FIG. 1, example Ethernet network 100 includes a first Ethernet node 102 and a second Ethernet node 104. The first and second Ethernet nodes 102 and 104 are connected by an Ethernet link 106. Ethernet nodes 102 and 104 may be any devices that support Ethernet. Ethernet link 106 may be any Ethernet compliant medium. Thus, example network 100 may represent any Ethernet configuration, including, for example, 10 Mbit/s Ethernet, Fast Ethernet (e.g., 100BASE-T, 100BASE-TX, etc.), Gigabit Ethernet (e.g., 1000BASE-T, 1000BASE-TX, etc.), and 10-Gigabit Ethernet (e.g., 10GBASE-SR, 10G-BASET, etc.).

The first and second Ethernet nodes 102 and 104 each includes a Medium Access Control (MAC) sublayer 108 and a physical interface transceiver (PHY) 110. MAC 108 is an Ethernet MAC as defined by the IEEE 802.3 Ethernet standard and implements the data-link layer of the Open System Interconnect (OSI) network model. PHY 110 is an Ethernet PHY as defined by the IEEE 802.3 standard and implements the physical layer of the OSI network model.

Typically, MAC 108 and PHY 110 communicate via a Media Independent Interface (MII), which is an Ethernet industry standard defined in IEEE 802.3. MII includes a data interface and a management interface. The data interface includes separate transmit and receive channels. The management interface is a two-signal interface (one signal for clocking and one signal for data) which allows MAC 108 to monitor and control PHY 110.

Figure 2:
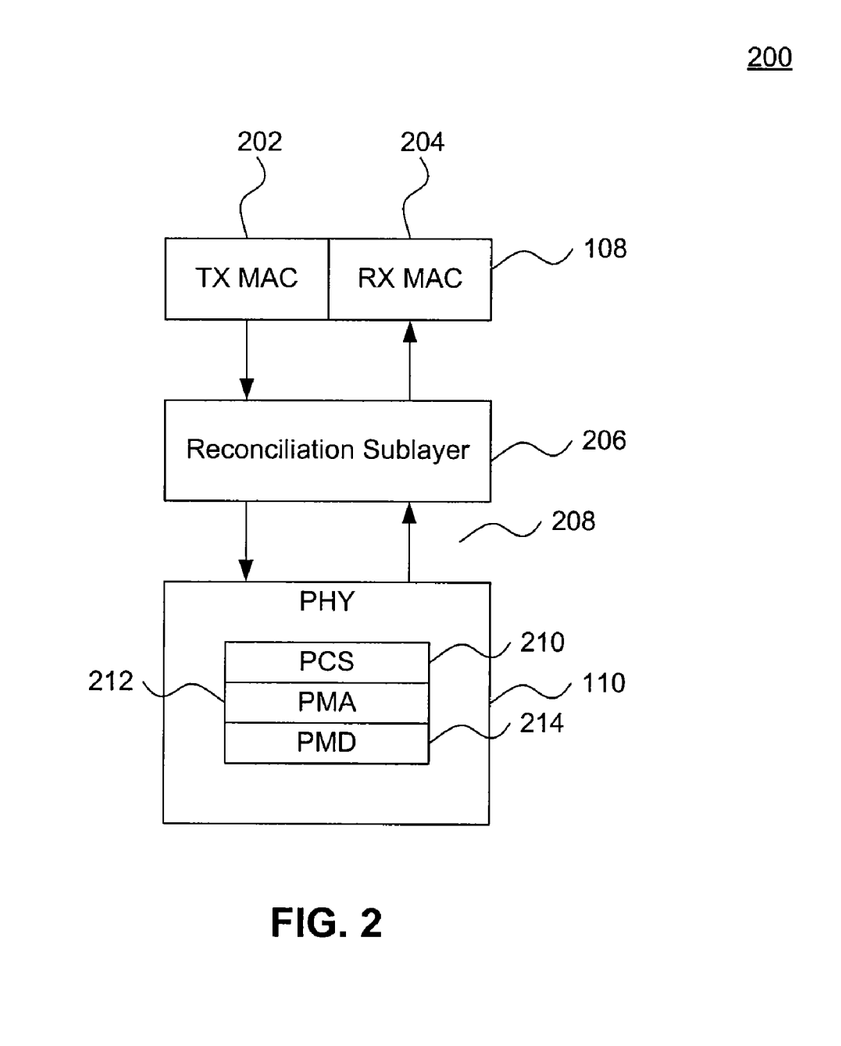
FIG. 2 is a block diagram that illustrates the Ethernet MAC and PHY layers of an Ethernet node.

FIG. 2 is a block diagram 200 that further illustrates the Ethernet MAC and PHY layers of an Ethernet node. As shown in FIG. 2, MAC 108 includes a transmit portion TX MAC 202 and a receive portion RX MAC 204. A reconciliation sublayer 206 connects MAC 108 to MII interface 208. Generally, reconciliation sublayer 206 maps Physical Signaling (PLS) service primitives from MAC 108 to MII signals, and vice versa. PHY 110 includes a Physical Coding Sublayer (PCS) 210, a Physical Medium Attachment (PMA) sublayer 212, and a Physical Medium Dependent (PMD) sublayer 214. Further description of the communication between the MAC and PHY layers and sublayers will be provided below.

Energy Efficient Ethernet (EEE)

The Energy Efficient Ethernet (EEE) standard (IEEE Std 802.3, which is incorporated herein by reference in its entirety), developed by the IEEE 802.3az Energy Efficient Ethernet Task Force, provides an optional mode of operation for Ethernet which allows Ethernet nodes to save power by disabling certain functionality (e.g., transmit and receive functions) over periods of low link utilization. The EEE mode of operation, called Low Power Idle (LPI) mode, can be supported over various Ethernet MAC and PHY configurations.

EEE defines a protocol to coordinate transitions to or from the LPI mode. This protocol will now be described with reference to FIGS. 1 and 2. For the purpose of presentation, first and second Ethernet nodes 102 and 104 of FIG. 1 will be hereafter referred to as local node 102 and remote node 104, respectively.

According to EEE, decisions regarding entering or exiting LPI mode are performed at the MAC level and are communicated to the PHY. For example, referring to FIG. 2, MAC 108 may trigger PHY 110 to enter LPI mode by communicating LP_IDLE codewords to PHY 110 via MII interface 208.

Before entering LPI mode, an EEE-compliant node must notify its link partner (i.e., the Ethernet node at the other end of the Ethernet link) that it is entering LPI mode. Referring to FIG. 1, for example, when PHY 110*a* of local node 102 (local PHY 110*a*) receives LP_IDLE codewords from MAC 108*a* (local MAC 108*a*), local PHY 110*a* transmits a LP_Sleep signal to PHY 110*b* of remote node 104 (remote PHY 110*b*). In 100BASE-T and 10GBASE-T EEE modes, the transmit function of local PHY 110*a* enters a quiet mode immediately after the LP_Sleep signal transmission. In 1000BASE-T LPI mode, the transmit function of local PHY 110*a* enters a quiet mode only after local PHY 110*a* transmits the LP_Sleep signal and receives a LP_Sleep signal from remote PHY 110*b*.

During the quiet mode, local PHY 110*a* ceases data transmissions and only periodically transmits LP_Refresh signals to remote PHY 110*b*. The LP_Refresh signals are used by remote node 104 to update adaptive filters and timing circuits in order to maintain link integrity. The quiet-refresh cycle continues until local MAC 108*a* signals to local PHY 110*a* to exit LPI mode by sending IDLE codewords via the MII interface, or when local PHY 110*a* receives IDLE codewords from remote PHY 110*b* originating from remote MAC 108*b*. Local PHY 110*a* then signals the termination of LPI mode to remote PHY 110*b* by sending an LP_Wake signal, and enters a normal Active mode.

As would be understood by a person skilled in the art, entering LPI mode by PHY 110*a* may also be triggered by receiving a LP_Sleep signal from PHY 110*b* in the reverse scenario to that described above.

Figure 3:
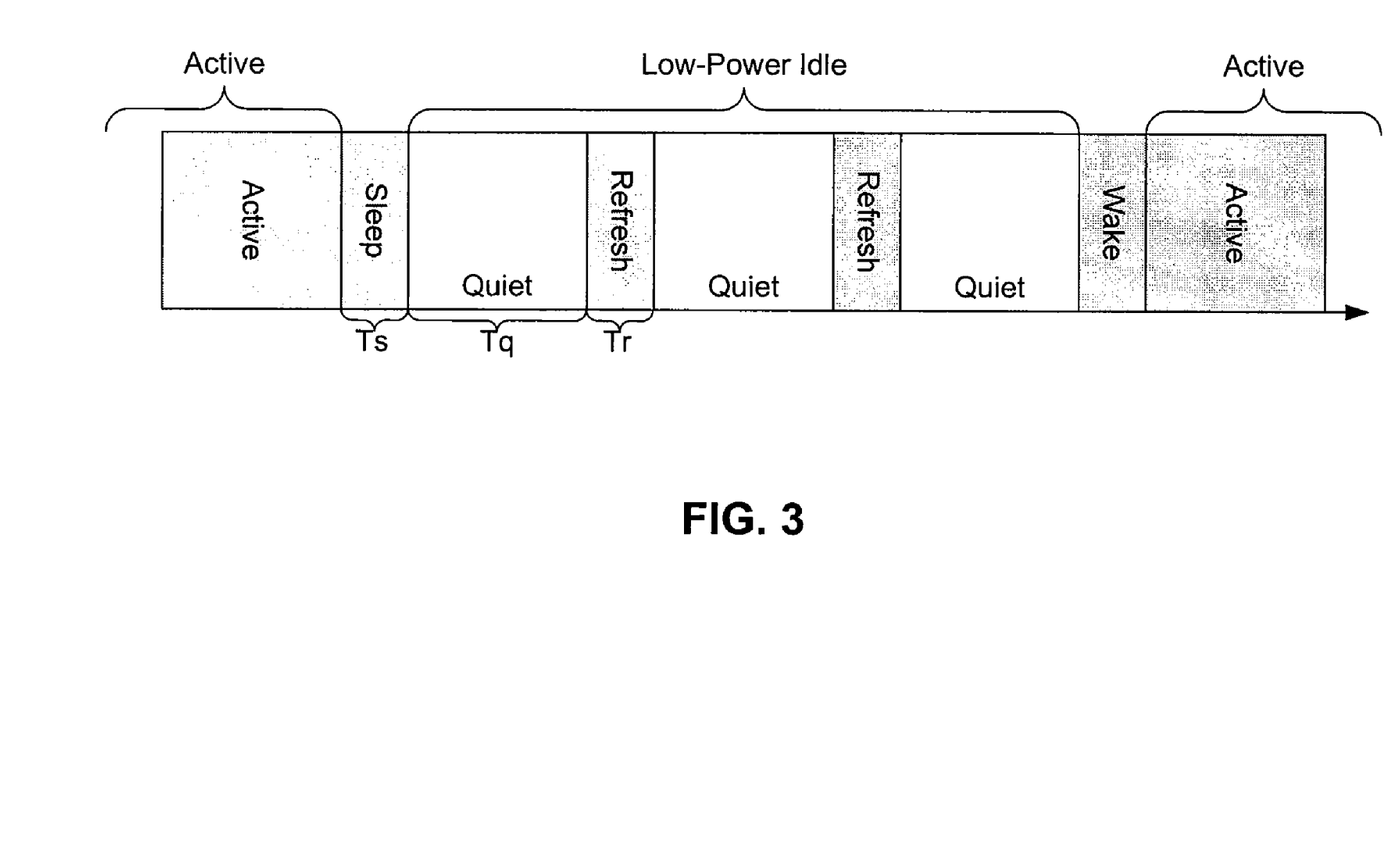
FIG. 3 illustrates different modes of operation of an EEE-compliant PHY.

FIG. 3 illustrates the different modes of operation of local PHY 110*a* as described above. As shown in FIG. 3, local PHY 110*a* is initially in an Active mode. In the Active mode, PHY 110*a* transmits data or idle signals. Then, PHY 110*a* begins to enter LPI mode by sending (and receiving) LP_Sleep signals. PHY 110*a* then enters LPI mode. During LPI mode, PHY 110*a* cycles between Quiet periods and LP_Refresh signal transmissions. When PHY 110*a* is ready to exit LPI mode, PHY 110*a* sends a LP_Wake signal, before returning to the Active state.

Figure 4:
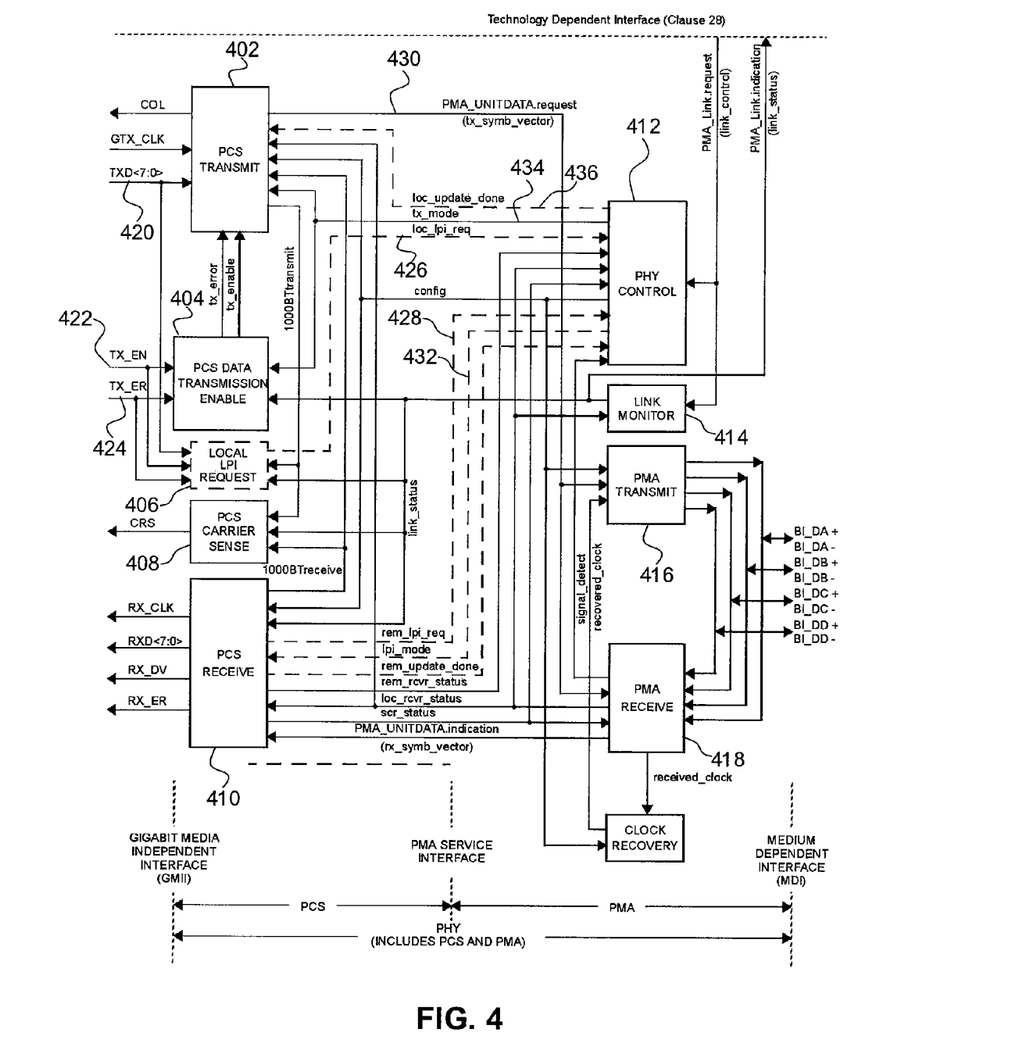
FIG. 4 is a block diagram that illustrates internal functions of a 1000BASE-T Ethernet PHY.

FIG. 4 is a block diagram that illustrates internal functions of a 1000BASE-T Ethernet PHY. FIG. 4 will be used below to describe interactions between the PHY and the MAC layer as well as internally within the PHY, which enable transitioning to/from LPI mode.

In particular, FIG. 4 illustrates functions of the PCS and PMA sublayers of a 1000BASE-T PHY. The PCS functions (i.e., PCS Transmit function 402, PCS Data Transmission Enable function 404, Local LPI Request function 406, PCS Carrier Sense function 408, and PCS Receive function 410) communicate via the MII interface with the MAC layer of the Ethernet node. PMA functions (i.e., PHY Control 412, Link Monitor function 414, PMA Transmit function 416, and PMA Receive function 418) communicate via a Medium Independent Interface (MDI) with lower sub-layers of the PHY (e.g., PMD sublayer). Further, as shown in FIG. 4, PCS functions and PMA functions communicate with each others via signals of a PMA service interface. It is noted that in FIG. 4 functions and signals relating to LPI mode are shown with dashed lines.

PCS Transmit function 402 receives a bundle of data signals TXD 420 from the MAC layer. PCS Transmit function 402 also receives a tx_enable signal from PCS Data Transmission Enable function 404. The tx_enable signal is set by PCS Data Transmission Enable function 404 according to a TX_EN signal 422, received from the MAC layer. TX_EN 422 is used by the MAC layer to enable/disable data transmission by PCS Transmit function 402 and the PHY generally.

When data transmission by PCS Transmit function 402 is enabled, PCS Transmit function 402 outputs signal tx_symb_vector 430, which includes a vector of symbols for transmission by PMA Transmit function 416. PCS Transmit function 402 may operate in three basic modes: normal, training mode, and low power idle mode. In normal mode, PCS Transmit function 402 generates code-groups that represent data, control, or idle (normal idle) for transmission by PMA Transmit function 416. In training mode, PCS Transmit function 402 generates only idle code-groups for transmission by PMA Transmit function 416. In low power idle mode, PCS Transmit function 402 generates only idle code-groups encoded with low power request and update status indications. In particular, in low power idle mode, PCS Transmit function 402 uses idle mode encoding, which employs a special subset of code-groups using only the symbols {2, 0, −2}, and additionally conveys within transmitted symbols the value of the signal loc_lpi_req 426, generated by Local LPI Request function 406 (described below). The mode of operation of PCS Transmit function 402 is determined by signal tx_mode 434, generated by PHY Control function 412 (described below).

Local LPI Request function 406 receives TXD 420, TX_EN 422, and a TX_ER signal 424. Using TXD 420, TX_EN 422, and TX_ER 424, Local LPI Request function 406 determines whether the local MAC is requesting entry to or exit from LPI mode and sets loc_lpi_req 426 accordingly. For example, the MAC layer may indicate a request to enter LPI mode by de-asserting TX_EN 422, asserting TX_ER 424, and setting TXD 420 to a specific value. The MAC maintains the same values for these signals for the entire time that it wishes the PHY to remain in LPI mode. When the MAC wishes that the PHY exit LPI mode, the MAC de-asserts TX_EN 422 and TX_ER 424. After a specified PHY wake up time, the MAC may assert TX_EN 422 to enable the PHY to resume data transmission.

Local LPI Request function 406 passes loc_lpi_req 426 to PMA PHY Control function 412. PHY Control function 412 also receives a rem_lpi_req signal 428 from PCS Receive function 410, which indicates whether or not the remote PHY is requesting entry into LPI mode. Based on loc_lpi_req 426 and rem_lpi_req 428, PHY Control function 412 generates signal lpi_mode 432. In 1000BASE-T LPI mode, PHY Control function 412 sets lpi_mode to TRUE when both loc_lpi_req 426 and rem_lpi_req 428 are TRUE. Thus, PHY Control function 412 will transition to a low power mode in response to concurrent requests for low power operation from the local PHY and the remote PHY.

According to EEE, transitioning to low power mode by PHY Control 412 includes a number of intermediate states. In particular, upon activation of the low power mode, PHY Control function 412 sets tx_mode signal 434 to the value SEND_I for a period of time, which allows the remote PHY to prepare for cessation of data transmission. Subsequently, PHY Control function 412 transitions to the POST_UPDATE state by setting loc_update_done 436 to TRUE, which signals to the remote PHY that it has completed the update of its receiver state. After the POST_UPDATE state, PHY Control function 412 transitions to the WAIT_QUIET state. Upon entry into the WAIT_QUIET state, PHY Control function 412 asserts tx_mode 434=SEND_Z (SEND ZERO transmission mode) and transmission ceases. During the WAIT_QUIET state, the PHY is capable of correctly decoding the rem_lpi_req signal. However, the PHY may deactivate transmit and receive functions in order to conserve energy. After the WAIT_QUIET state, the PHY enters into the QUIET state for a period defined by a corresponding state timer.

When the QUIET state timer expires, the PHY initiates a wake sequence. The sequence includes a WAKE, a WAKE_SILENT, and a WAKE_TRAINING state. The WAKE_TRAINING state includes an accelerated training mode sequence leading into the UPDATE state. During the WAKE_TRAINING state after synchronization between the local scrambler and the remote scrambler is achieved, and also during the UPDATE state, the value of rem_lpi_req can be determined. Accordingly, the local PHY can determine whether or not to remain in LPI mode. If both PHYs continue to request LPI mode, then PHY Control function 412 transitions into POST_UPDATE as described above. Otherwise, if either or both PHYs no longer request LPI mode, then PHY Control function 412 transitions into SEND IDLE OR DATA mode by asserting tx_mode=SEND_N.

Parallel Detection of Remote LPI Request and Send Zero Mode

As described above, during low power idle mode, a PHY (e.g., local PHY) conveys to its link partner PHY (e.g., remote PHY) information about whether it is requesting entry into low power mode or not. This is done by encoding the signal loc_lpi_req 426 within normal idle codewords. The link partner PHY decodes the encoded loc_lpi_req 426 to generate its rem_lpi_req 428 signal.

In 1000BASE-T LPI mode, it is essential that a PHY properly decode its rem_lpi_req 428 signal at all times. Generally, the PHY relies on the fact that its scrambler is synchronized with the scrambler of its link partner. However, when its link partner enters the WAIT_QUIET state and asserts tx_mode 434=SEND_Z (SEND ZERO mode), the PHY can no longer decode its rem_lpi_req 428 using its scrambler because its link partner has effectively ceased transmission.

Accordingly, when its link partner PHY enters SEND_Z mode, the PHY cannot determine whether its link partner PHY is still conveying its loc_lpi_req 426 signal or is already sending zeros. Therefore, the PHY needs to detect whether its link partner PHY has entered SEND_Z before a false detection of rem_lpi_req 428 occurs. In other words, the PHY encounters a racing condition between detecting the SEND_Z mode of its link partner and detecting its rem_lpi_req 428 signal.

Conventional solutions rely on energy detection (either analog or digital) to detect whether the link partner PHY is transmitting energy on the link. If no energy is detected, then it is assumed that the link partner PHY has entered its SEND_Z mode. However, for several reasons, conventional solutions are impractical. For example, solutions based on analog energy detection falsely detect energy on the link because of echo and crosstalk from the local transmitter. On the other hand, digital energy detection solutions first remove the echo and crosstalk, but suffer from latency associated with removing echo and crosstalk, which can be too high to avoid false detection of rem_lpi_req. In addition, even when SEND_Z is detected correctly, conventional solutions require that detection of rem_lpi_req be disabled during SEND_Z mode to avoid false detection of rem_lpi_req and accidental transitioning out of LPI mode by the PHY.

Embodiments of the present invention enable robust and quick parallel detection of remote LPI request (rem_lpi_req) and SEND_Z mode. Embodiments do not rely on energy detection for detecting SEND_Z. Therefore, SEND_Z can be detected reliably and with minimal latency. In addition, since SEND_Z and rem_lpi_req are detected in parallel, embodiments are not concerned with the false detection of rem_lpi_req (before SEND_Z is detected) or the need to disable detection of rem_lpi_req (after SEND_Z is detected).

Figure 5:
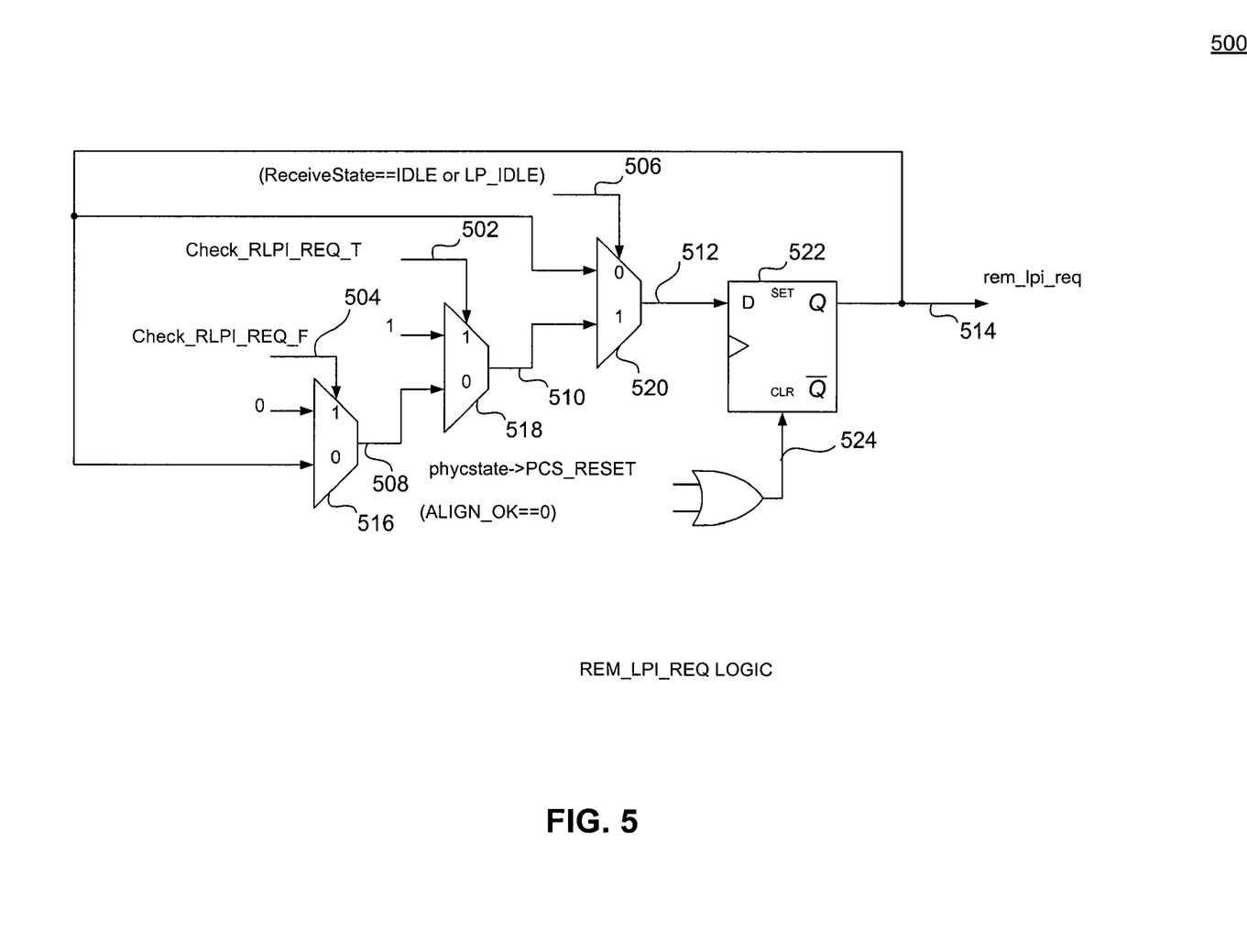
FIG. 5 is an example implementation of logic circuitry for detecting the remote LPI request signal according to an embodiment of the present invention.

FIG. 5 is an example implementation 500 of logic circuitry for detecting the remote LPI request signal (rem_lpi_req) according to an embodiment of the present invention. As would be understood by a person skilled in the art, embodiments of the present invention are not limited to example implementation 500, but include any logic circuitry capable of similar function as example implementation 500.

As shown in FIG. 5, example implementation 500 includes a plurality of multiplexers 516, 518, and 520 and a D latch 522. Multiplexer 520 receives as inputs rem_lpi_req signal 514 and output signal 510 of multiplexer 518, and is controlled by selector signal 506. Selector signal 506 is a logic "1" when the remote PHY is operating in normal idle mode or low power idle mode and a logic "0" otherwise. This ensures that output signal 512 of multiplexer 520 (and correspondingly rem_lpi_req 514) updates value only when the remote PHY is operating in idle mode or low power idle mode (since it is during idle mode or low power idle mode that loc_lpi_req is conveyed by the remote PHY).

Figure 7:
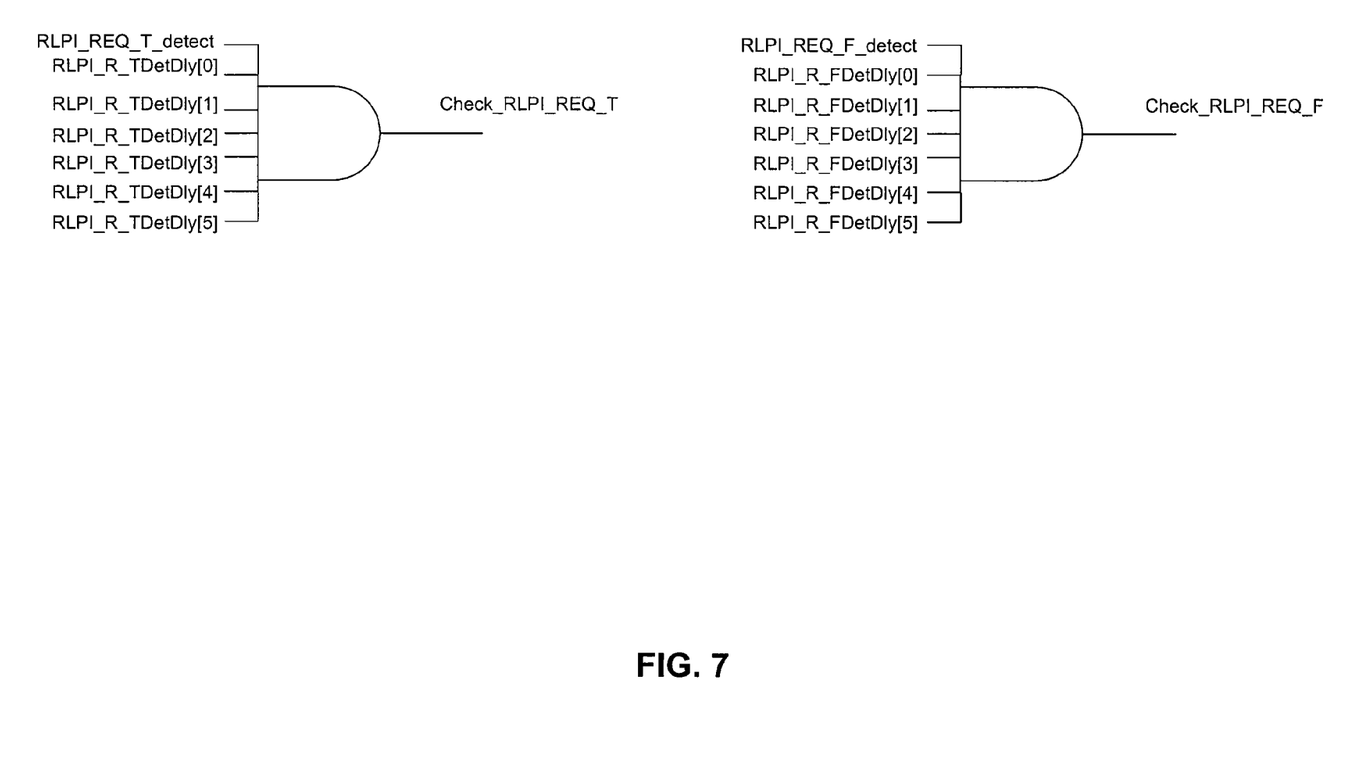
FIGS. 7 and 8 illustrate example logic circuitry used in detecting the remote LPI request signal and SEND ZERO mode according to an embodiment of the present invention.

Multiplexer 518 receives as inputs a logic "1" signal and output signal 508 of multiplexer 516, and is controlled by selector signal 502. Selector signal 502 is set based on the signal Check_RLPI_REQ_T. Check_RLPI_REQ_T takes a logic "1" ("0") value when it is determined that the decoded value of rem_lpi_req is a logic "1" ("0"). In an embodiment, as shown in FIG. 7, Check_RLPI_REQ_T is based on several consecutive decoded values of rem_lpi_req. For example, in FIG. 7, Check_RLPI_REQ_T is based on seven consecutive values of the signal RLPI_REQ_T_detect, which takes a logic "1" value when the decoded rem_lpi_req is a logic "1" and a logic "0" value when the decoded rem_lpi_req is a logic "0." Thus, Check_RLPI_REQ_T takes a logic "1" value only after seven consecutive decoded symbols result in the decoded rem_lpi_req equal to "1."

Referring back to FIG. 5, output signal 510 of multiplexer 518 takes a logic "1" value when signal Check_RLPI_REQ_T is a logic "1." Otherwise, output signal 510 follows output signal 508 of multiplexer 516.

Multiplexer 516 receives as inputs a logic "0" signal and rem_lpi_req signal 514, and is controlled by selector signal 504. Selector signal 504 is set based on the signal Check_RLPI_REQ_F. Check_RLPI_REQ_F takes a logic "1" ("0") value when it is determined that the decoded value of rem_lpi_req is a logic "0" ("1"). In an embodiment, as shown in FIG. 7, Check_RLPI_REQ_F is based on several consecutive decoded values of rem_lpi_req. For example, in FIG. 7, Check_RLPI_REQ_F is based on seven consecutive values of the signal RLPI_REQ_F_detect, which takes a logic "1" value when the decoded rem_lpi_req is a logic "0" and a logic "0" value when the decoded rem_lpi_req is a logic "1." Thus, Check_RLPI_REQ_F takes a logic "1" value only after seven consecutive decoded symbols result in rem_lpi_req equal to "0."

Referring back to FIG. 5, output signal 508 of multiplexer 516 takes a logic "0" value when signal Check_RLPI_REQ_F is a logic "1." Otherwise, output signal 508 follows rem_lpi_req signal 514.

D-latch 522 receives output signal 512 of multiplexer 520 and outputs rem_lpi_req signal 514. D-latch 522 also receives a "clear" signal 524, which can be used to reset D-latch 522.

According to an embodiment of the present invention, three possible combinations exist for signals Check_RLPI_REQ_T and Check_RLPI_REQ_F. These are Check_RPLI_REQ_T="1" and Check_RLPI_REQ_F="0"; Check_RLPI_REQ_T="0" and Check_RLPI_REQ_F="1"; and Check_RLPI_REQ_T="0" and Check_RLPI_REQ_F="0." For the first and second combinations, the status of rem_lpi_req can be determined as "1" and "0," respectively. For the third combination, however, the status of rem_lpi_req cannot be determined and rem_lpi_req maintains its current status. In practice, the third combination will occur when the remote PHY is not sending idle (either normal idle or low power idle) codewords (and is likely sending zeros). In FIG. 5, the occurrence of the third combination is managed by multiplexer 520, which ensures that rem_lpi_req 514 updates value only when the remote PHY is operating in idle mode or low power idle mode.

Figure 6:
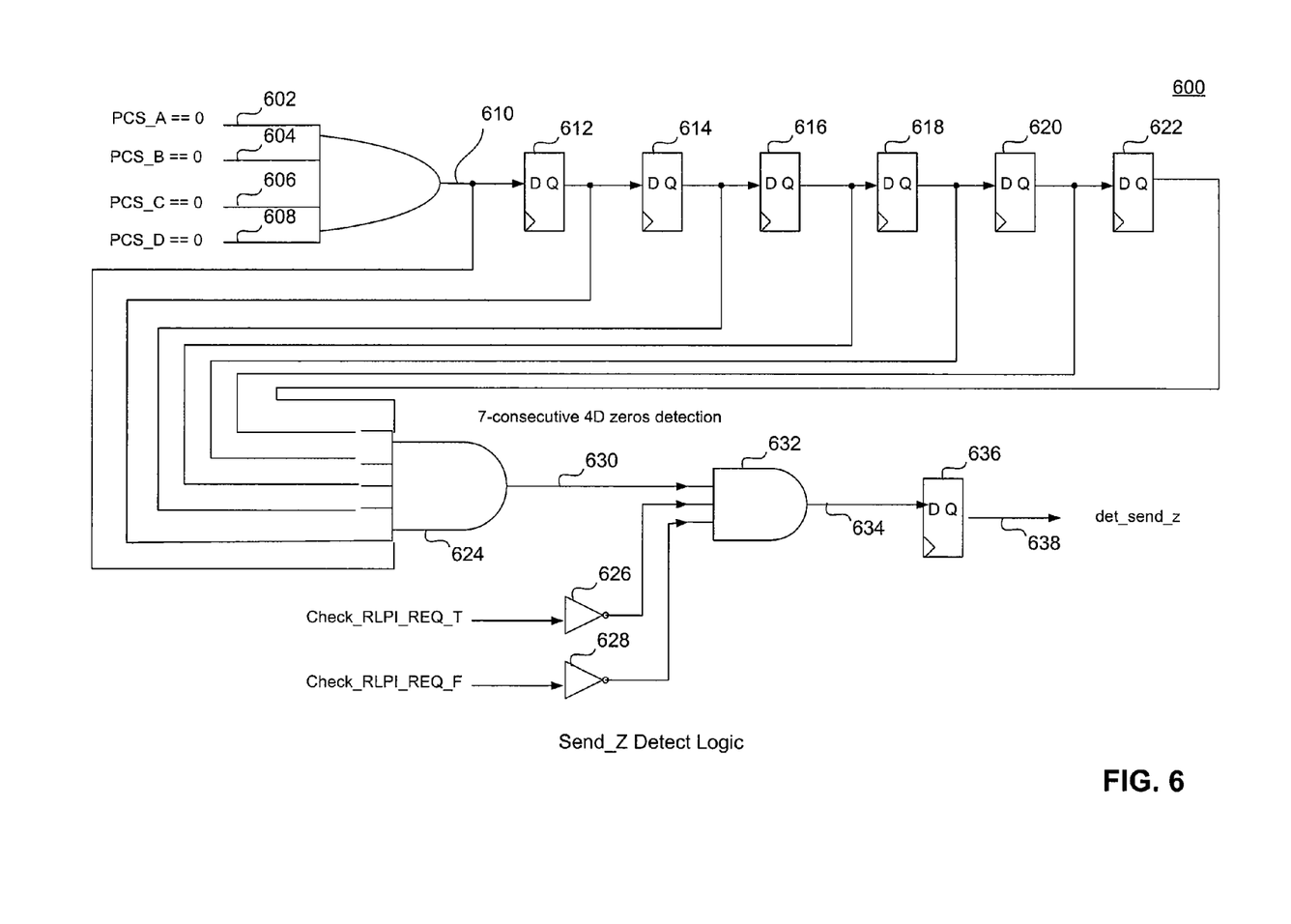
FIG. 6 is an example implementation of logic circuitry for detecting SEND ZERO mode according to an embodiment of the present invention.

FIG. 6 is an example implementation 600 of logic circuitry for detecting SEND_Z mode according to an embodiment of the present invention. As would be understood by a person skilled in the art, embodiments of the present invention are not limited to example implementation 600, but include any logic circuitry capable of similar function as example implementation 600.

Example implementation 600 is based on detecting seven consecutive 4-dimensional zeros on the four receive PCS channels (A-D) (in 1000BASE-TX) in order to determine that SEND_Z has been detected. A 4-dimensional (4-D) zero is obtained when all four PCS channels are zero. In addition, example implementation 600 takes into account the signals Check_RLPI_REQ_T and Check_RLPI_REQ_F, described above, to ensure that SEND_Z is detected only when the status of rem_lpi_req cannot be determined (i.e., when both Check_RLPI_REQ_T and Check_RLPI_REQ_F are "0").

Accordingly, as shown in FIG. 6, output signal det_send_z 638 is based on output signal 634 of AND gate 632. Signal 634 is a logic "1" only when output signal 630 of AND gate 624 is a logic "1" and both Check_RLPI_REQ_T and Check_RLPI_REQ_F are logic "0" (note that Check_RLPI_REQ_T and Check_RLPI_REQ_F are passed through respective inverters 626 and 628 before they are input into AND gate 632).

Output signal 630 of AND gate 624 is a logic "1" when seven consecutive 4-D zeros are received and a logic "0" otherwise. Indeed, as shown in FIG. 6, the output 610 of AND gate 640 is a logic "1" when all four of its inputs are a logic "1," which corresponds to all four PCS channels (A-D) being equal to zero. In an embodiment, consecutive outputs of AND gate 640 are stored in latches 612-622 and then input into AND gate 624.

As would be understood by a person skilled in the art based on the teachings herein, example implementation 600 may be based on detecting more or less than seven consecutive 4-D zeros. Similarly, signals Check_RLPI_REQ_T and Check_RLPI_REQ_F, shown in FIG. 7, may be determined based on more or less than seven consecutive decoded values of rem_lpi_req.

Figure 8:
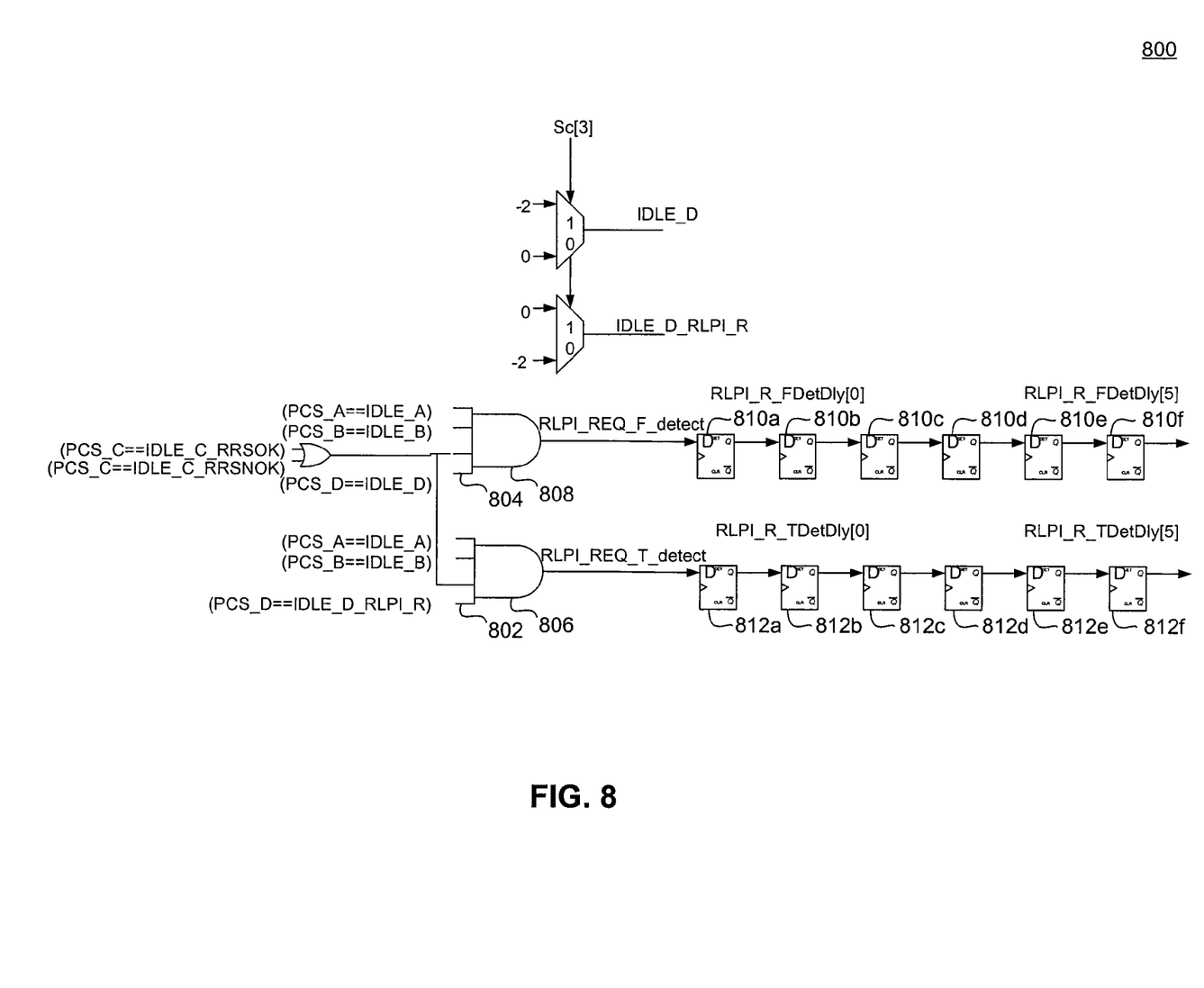

FIGS. 7 and 8 illustrate example logic circuitry for generating signals Check_RLPI_REQ_T and Check_RLPI_REQ_F according to an embodiment of the present invention. As would be understood by a person skilled in the art, embodiments of the present invention are not limited to the example implementations of FIGS. 7 and 8, but include any logic circuitry capable of similar function as the example implementations of FIGS. 7 and 8.

Example logic circuitry 800 of FIG. 8 generates seven consecutive values of the signals RLPI_REQ_F_detect and RLPI_REQ_T_detect. As shown in FIG. 8, consecutive values of RLPI_REQ_F_detect are stored in respective D-latches 810a-f. Similarly, consecutive values of RLPI_REQ_T_detect are stored in respective latches 812a-f.

The outputs of latches 810a-f together with the current output of AND gate 808 are used to generate signal Check_RLPI_REQ_F as shown in FIG. 7. Similarly, the outputs of latches 812a-f together with the current output of AND gate 806 are used to generate signal Check_RLPI_REQ_T as shown in FIG. 7.

As shown in FIG. 8, signals RLPI_REQ_F_detect and RLPI_REQ_T_detect are determined based on the symbol values of the four PCS receive channels (A-D). In particular, RLPI_REQ_F_detect is a logic "1" when channels A, B, and D are sending normal idle codewords. On the other hand, RLPI_REQ_T_detect is a logic "1" when channels A and B are sending normal idle codewords and channel D is sending low power idle codewords.

As would be understood by a person skilled in the art based on the teachings herein, embodiments of the present invention described above can be implemented within the PHY layer of an EEE-compliant Ethernet node. In particular, embodiments of the present invention can be implemented within the PCS Receive function of the PHY layer. In addition, a person skilled in the art would understand that while embodiments of the present invention have been described herein using logic circuit implementations, embodiments of the present invention are not limited to such logic circuit implementations and may be implemented using any combination of hardware and/or software capable of similar function.

CONCLUSION

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. An Ethernet PHY, comprising:
circuitry that determines in parallel a low power idle (LPI) status and a SEND ZERO mode (SEND_Z) status of a link partner PHY connected to the Ethernet PHY via an Ethernet link,
wherein the circuitry comprises:
first circuitry that determines a remote LPI request signal, wherein the remote LPI request signal corresponds to a local LPI request signal conveyed by the link partner PHY to the Ethernet PHY and representative of the LPI status of the link partner PHY; and
second circuitry that determines a SEND_Z status signal representative of the SEND_Z status of the link partner PHY.

2. The Ethernet PHY of claim 1, wherein the Ethernet PHY is an Energy Efficient Ethernet (EEE)-compliant PHY.

3. The Ethernet PHY of claim 1, wherein the Ethernet PHY is a 1000BASE-T Ethernet PHY.

4. The Ethernet PHY of claim 1, wherein the remote LPI request signal and the SEND_Z status signal are determined simultaneously, thereby avoiding false detection of the remote LPI request signal before the SEND_Z status signal is determined.

5. The Ethernet PHY of claim 1, wherein the first circuitry determines the remote LPI request signal based on a plurality of consecutive symbol sets, each symbol set including a plurality of symbols received on respective channels of the Ethernet link.

6. The Ethernet PHY of claim 1, wherein the first circuitry updates the remote LPI request signal only when the link partner PHY is transmitting idle mode symbols.

7. The Ethernet PHY of claim 1, wherein the first circuitry generates a first signal representative of the event that each of a plurality of consecutive decoded values of the remote LPI request signal takes a logic "1" value, and a second signal representative of the event that each of the plurality of consecutive decoded values of the remote LPI request takes a logic "0" value.

8. The Ethernet PHY of claim 7, wherein the remote LPI request signal is configured to take a logic "1" value when the first signal takes a logic "1" value and the second signal takes a logic "0" value; is configured to take a logic "0" value when the first signal takes a logic "0" value and the second signal takes a logic "1" value; and is indeterminable and maintains its current value when the first signal takes a logic "0" and the second signal takes a logic "0" value.

9. The Ethernet PHY of claim 7, wherein the second circuit determines the SEND_Z status signal based on a plurality of consecutive symbol sets, each symbol set including a plurality of symbols received on respective channels of the Ethernet link.

10. The Ethernet PHY of claim 9, wherein the second circuit generates a third signal representative of the event that every symbol of each of the plurality of consecutive symbol sets is equal to zero.

11. The Ethernet PHY of claim 10, wherein the second circuit determines the SEND_Z status signal based on the third signal and the first and second signals generated by the first circuit.

12. The Ethernet PHY of claim 11, wherein the SEND_Z status signal is configured to take a logic "1" value only when the third signal takes a logic "1" value and the first and second signals each takes a logic "0" value, and is configured to take a logic "0" value otherwise.

13. An Ethernet node, comprising: an Energy Efficient Ethernet (EEE) PHY, wherein the EEE PHY comprises: circuitry that determines a low power idle (LPI) status and a SEND ZERO mode (SEND_Z) status of a link partner PHY connected to the Ethernet PHY via an Ethernet link, wherein the circuitry comprises: first circuitry that determines a remote LPI request signal, wherein the remote LPI request signal corresponds to a local LPI request signal conveyed by the link partner PHY to the Ethernet PHY and representative of the LPI status of the link partner PHY; and second circuitry that determines a SEND_Z status signal representative of the SEND_Z status of the link partner PHY.

14. The Ethernet node of claim 13, wherein the EEE PHY is a 1000BASE-T Ethernet PHY.

15. The Ethernet node of claim 13, wherein the remote LPI request signal and the SEND_Z status signal are determined simultaneously, thereby avoiding false detection of the remote LPI request signal before the SEND_Z status signal is determined.

16. An Ethernet PHY, comprising:
means for determining in parallel a low power idle (LPI) status and a SEND ZERO mode (SEND_Z) status of a link partner PHY connected to the Ethernet PHY via an Ethernet link,
wherein the means for determining comprises:
first means for determining a remote LPI request signal, wherein the remote LPI request signal corresponds to a local LPI request signal conveyed by the link partner PHY to the Ethernet PHY and representative of the LPI status of the link partner PHY; and
second means for determining a SEND_Z status signal representative of the SEND_Z status of the link partner PHY.

17. The Ethernet PHY of claim 16, wherein the Ethernet PHY is an Energy Efficient Ethernet (EEE)-compliant PHY.

18. The Ethernet PHY of claim 16, wherein the Ethernet PHY is a 1000BASE-T Ethernet PHY.

19. The Ethernet PHY of claim 16, wherein the remote LPI request signal and the SEND_Z status signal are determined simultaneously, thereby avoiding false detection of the remote LPI request signal before the SEND_Z status signal is determined.

* * * * *